United States Patent
Beach et al.

(10) Patent No.: US 11,544,505 B1
(45) Date of Patent: Jan. 3, 2023

(54) SEMI-SUPERVISED LEARNING BASED ON CLUSTERING OBJECTS IN VIDEO FROM A PROPERTY

(71) Applicant: Alarm.com Incorporated, Tysons, VA (US)

(72) Inventors: Allison Beach, Leesburg, VA (US); Benjamin Asher Berg, Washington, DC (US); Sung Chun Lee, Tysons, VA (US); Sima Taheri, McLean, VA (US); Sravanthi Bondugula, Vienna, VA (US); Nafiseh Salmani Niyasar, Sterling, VA (US); Gang Qian, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 392 days.

(21) Appl. No.: 16/829,402

(22) Filed: Mar. 25, 2020

Related U.S. Application Data (60) Provisional application No. 62/827,326, filed on Apr. 1, 2019.

(51) Int. Cl.
*G06K 9/62* (2022.01)
*G06V 20/52* (2022.01)

(52) U.S. Cl.
CPC ......... *G06K 9/6259* (2013.01); *G06K 9/6222* (2013.01); *G06K 9/6263* (2013.01); *G06V 20/52* (2022.01)

(58) Field of Classification Search
CPC .. G06K 9/6259; G06K 9/6222; G06K 9/6223; G06K 9/6263; G06V 20/52
See application file for complete search history.

(56) References Cited

U.S. PATENT DOCUMENTS

| | | | |
|---|---|---|---|
| 2011/0129126 A1* | 6/2011 | Begeja | G06F 16/784 382/118 |
| 2019/0073530 A1* | 3/2019 | Saptharishi | G06V 20/41 |

OTHER PUBLICATIONS

Zhuang, Yueting, et al. "Adaptive keyframe extraction using unsupervised clustering." Proceedings 1998 international conference on image processing. icip98 (cat. No. 98cb36269). vol. 1. IEEE, 1998. (Year: 1998).*

(Continued)

*Primary Examiner* — Amandeep Saini
*Assistant Examiner* — Raphael Schwartz
(74) *Attorney, Agent, or Firm* — Fish & Richardson P.C.

(57) ABSTRACT

Methods, systems, and apparatus, including computer programs encoded on a computer storage medium, for semi-supervised training of an object recognition model. The methods, systems, and apparatus include a monitoring system including a camera located at a property and configured to generate images and one or more computers and one or more storage devices storing instructions that are operable, when executed by the one or more computers, to cause the one or more computers to perform actions of determining a cluster of images meets a threshold for number of included images and a threshold for cluster tightness. A representative image of the cluster is selected and a query including the representative image of the cluster is provided. User feedback responsive to the query is received and an object recognition model is updated based on the user feedback.

20 Claims, 3 Drawing Sheets

(56) References Cited

OTHER PUBLICATIONS

Bromley et al., "Signature Verification Using a Siamese Time Delay Neural Network," International Journal of Pattern Recognition and Artificial Intelligence, 1993, vol. 7 No. 4, 19 pages.
Chopra et al., "Learning a Similarity Metric Discriminatively, with Application to Face Verification," In Computer Vision and Pattern Recognition, CVPR 2005. IEEE Computer Society Conference on, 2005, vol. 1, 8 pages.
Dubska et al., "Automatic Camera Calibration for Traffic Understanding," BMVC, 2014, 12 pages.
Waleed Abdulla, "Mask R-CNN for Object Detection and Segmentation," GitHub Repository, GitHub 2017, [retrieved on Jun. 2, 2020], retrieved from: URL<https://github.com/matterport/MaskRCNN>, 15 pages.

* cited by examiner

SEMI-SUPERVISED LEARNING BASED ON CLUSTERING OBJECTS IN VIDEO FROM A PROPERTY

CROSS-REFERENCE TO RELATED APPLICATIONS

This application claims the benefit of U.S. Provisional Application No. 62/827,326, filed Apr. 1, 2019, which is incorporated by reference in its entirety.

TECHNICAL FIELD

This disclosure relates generally to training an object recognition model for surveillance devices using semi-supervised learning.

BACKGROUND

For a residential-based commercial intelligent surveillance system solution, detecting vehicles, animals, or people and having the ability to differentiate quickly between them is valuable for preventing unnecessary alerts and/or incurring costs associated with false alarms. To reach a level of efficacy where such systems are useful, substantial ground truth data is required. Since the ground truth data may be specific to a user's particular environment, the training data typically must be provided by the user themselves or collected over a prolonged period of time.

SUMMARY

Techniques are described for using semi-supervised learning based on clustering of objects to train a site-specific object recognition model. The amount of queries provided to a user for ground truth verification to be used for generating sets of multiple ground truthed image clusters for site-specific objects of interest may be reduced by using clustering techniques. Images of particular objects of interest may be first clustered and then the user may be queried with representative images of the clusters to verify whether each cluster should be a separate cluster. Clusters may be combined based on the user input and the verified ground truth representative images of each cluster can be used to establish additional pseudo ground truth images for each cluster composed of the other images included in each cluster, where the ground truth of the other images included in each cluster is assumed based on the ground truth of the representative images. The site-specific ground truth images can be used to train a site-specific object recognition model to discriminate between different site-specific sub-classes of objects.

Implementations of the described techniques may include hardware, a method or process implemented at least partially in hardware, or a computer-readable storage medium encoded with executable instructions that, when executed by a processor, perform operations.

In general, one innovative aspect of the subject matter described in this specification can be embodied in a monitoring system that is configured to monitor a property including a camera that is located at the property and is configured to generate images, and one or more computers and one or more storage devices storing instructions that are operable, when executed by the one or more computers, to cause the one or more computers to perform operations including determining a cluster of images meets a threshold for number of included images and a threshold for cluster tightness, selecting a representative image of the cluster, providing a query including the representative image of the cluster, receiving user feedback responsive to the query, and updating an object recognition model based on the user feedback. Other embodiments of this aspect include corresponding methods, apparatus, and computer programs, configured to perform the action of the methods, encoded on computer storage devices.

These and other embodiments can each optionally include one or more of the following features. In some implementations, updating an object recognition model based on the user feedback includes determining that the user feedback is negative, and in response to determining that the user feedback is negative, retraining the cluster of images to include a different set of images. Updating an object recognition model based on the user feedback can include determining that the user feedback is negative, and in response to determining that the user feedback is negative, combining the cluster of images and another cluster of images.

In some implementations, updating an object recognition model based on the user feedback can include determining that the user feedback is positive, and in response to determining that the user feedback is positive, updating the object recognition model with the cluster of images. Updating an object recognition model based on the user feedback can include determining that the user feedback is positive, and in response to determining that the user feedback is positive, reinforcing the cluster.

In some implementations, selecting a representative image includes selecting a particular image from a center of the cluster, where the query requests that the user identify the object in the particular image. Selecting a representative image can include selecting a particular image from an edge of the cluster, where the query provides an identity of an object in the particular image and requests that the user verify the identity of the object.

In some implementations, the methods include detecting an object based on the object recognition model, and providing, to a user, an alert that indicates that the object was detected.

The techniques described in this disclosure provide one or more of the following advantages. By reducing a level of effort required to train a site-specific object recognition model, a cost-benefit curve shifts such that the site-specific object recognition model can be valuable for significant adoption. The site-specific object recognition model can be generated using fewer ground truth images, reducing an amount of user feedback required from a user and shortening a period of time for image collection before a useful objection recognition model can be implemented. Quick adaptation and flexibility to add new objects (e.g., new vehicles, new people, etc.) to the object recognition model is possible due to a reduced number of images required to be verified and labelled by a human user of the new objects before the objection recognition model can be trained to recognize the new objects.

Additionally, the clustering techniques described herein can be applied to generating ground truth training data for training a classifier, e.g., training a classifier to recognize similar vehicles. For example, a diverse training dataset where the images are representative of multiple clusters The details of one or more implementations are set forth in the accompanying drawings and the description below. Other features will be apparent from the description and drawings, and from the claims.

DETAILED DESCRIPTION

Techniques are described for semi-supervised training of an object recognition model based on clustering of objects. Clustering techniques can be applied to objects detected by surveillance devices of a home monitoring system to assist in building a site-specific object recognition model, which can in turn provide a refined interpretation of a video feed of a camera using the site-specific object recognition model, e.g., improving the accuracy of detections and/or improve the precision of the data for tracking of objects of interest.

Figure 1:
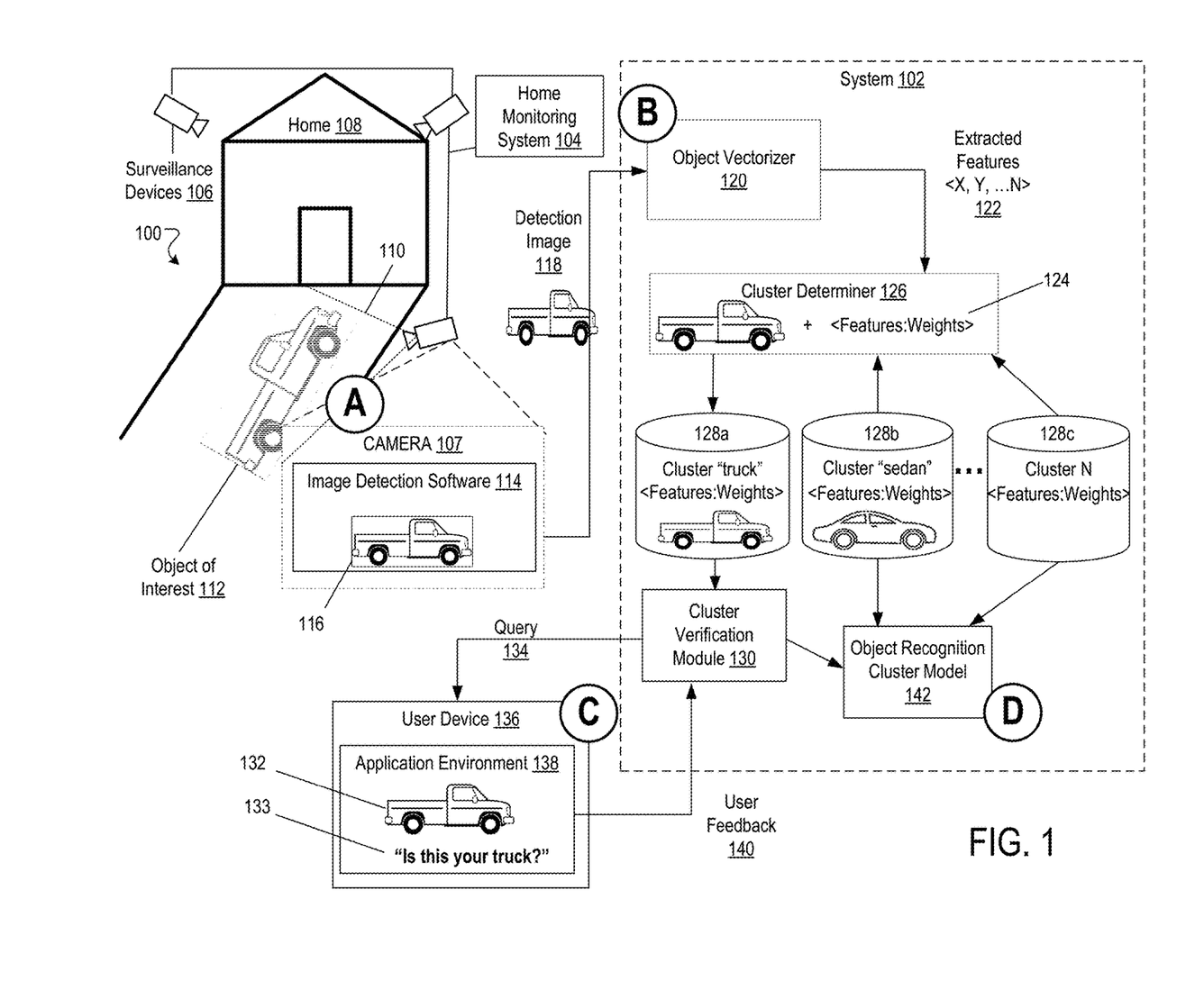
FIG. 1 is block diagram of an example operating environment for a semi-supervised object recognition model training system.

FIG. 1 is a block diagram of an example operating environment 100 for a semi-supervised object recognition model training system 102. The home monitoring system 104 can include a set of surveillance devices 106 located in or surrounding the home 108, including, for example, cameras, motion detectors, window/door sensors, and keypad access door locks. The surveillance devices 106 may be installed indoors or outdoors, and can each have a field of view of a particular area of home 108. As depicted in the example environment 100 of FIG. 1, a surveillance device 106 is a camera 107 (e.g., surveillance camera, night-vision camera, infrared camera, or the like) that captures video or still images of an area of the home 108 or is a motion detector that senses movement in a region of the home 108.

Home 108 can be, for example a residence (e.g., a single-family home, a town house, a condominium, or an apartment). In some implementations, a home 108 can be a commercial property (e.g., a business, government building, or a public space). In some implementations, the home monitoring system 104, the semi-supervised object recognition model training system 102, or a combination of the two systems can be hosted on one or more servers. Though described here as a home monitoring system 104 and a semi-supervised object recognition model training system 102, the functions described of each system can be implemented instead on more or fewer systems. In some implementations, the semi-supervised object recognition model training system 102 is a sub-system of the home monitoring system 104.

In some implementations, camera 107 may record the environment within its respective field of view 110 continuously and may detect objects of interest 112. In particular, an object of interest 112 can be a human, vehicle, or animal target. For example, an object of interest 112, as depicted in FIG. 1, is a truck parked in a driveway of home 108.

In some implementations, camera 107 may record discontinuously and include one or more triggers (e.g., a movement trigger, sound trigger, and change in lighting trigger) for activating a recorded video and/or image. For example, a motion sensor may detect motion of an object of interest 112 within the field of view 110 of the camera 107, e.g., the truck arriving in the driveway of home 108, and trigger capturing the environment in an image or video clip. In another example, camera 107 may automatically capture scheduled bursts of video and/or images within the field of view of the surveillance device 106 (e.g., every 10 seconds, every 60 seconds, every 5 minutes, or the like).

Camera 107 can include image detection software 114 to capture and detect potential objects of interest 112 in the field of view 110 of the camera 107. An image 116 including an object of interest 112 can be processed by the image detection software 114 and object of interest 112 may be classified as a generic class of object of interest, e.g., a "vehicle," a "human," an "animal," or the like.

In some implementations, one or more detection rules can be provided to the camera 107, where the camera 107 collected image data when an object is determined to enter the field of view 110 of the camera 107. In some implementations, the image detection software 114 can include a generic object recognition model that is provided to the camera 107 when the camera is installed.

In some implementations, the image detection software 114 includes a classifier to identify and classify object of interest 112 as a class of object. For example, a class of object of interest 112 can include human, animal, vehicle, vessels, bug, nature, or the like. For each class of object, the image detection software 114 may include a database of physical properties of the class of object (e.g., size, speed, relative locations of features, etc.). In some implementations, a mapping between image and world coordinates may be used to create a database which stores average features of various objects (e.g., average human feature locations and size) to assist in object classification. For example, the image detection software 114 may include a database of human targets, including average human target size (e.g., size of bounding box containing a human target) and relative location points for the head point and foot point.

In stage A of FIG. 1, a detection of an object of interest 112 in an image 116 results in the image 116 being uploaded to system 102 as a detection image 118 over a network. The uploaded detection image 118 can additionally include metadata associated with the collection of the detection image, e.g., date and time, information about a particular location of camera 107 of the multiple surveillance devices 106 that captured the detection image 118, about where in the scene of the detection image is the object of interest 112, about a preliminary classification of the object of interest 112 in the detection image 118, about an identification of the objection of interest 112 in the detection image, or a combination thereof.

In some implementations, the system 102 can include a verification process to confirm that the detection images 118 provided to the system 102 are representative of true positive detections, that is, that each of the detection images actually shows an object of interest 112 within the scene of the detection image 118.

In stage B of FIG. 1, an object vectorizer 120 receives, as input, the detection image 118 including the object of interest 112, e.g., the truck in the driveway of the home 108. In some implementations, the object vectorizer 120 can also receive, as input, classification information for the object of interest 112 from the image detection software 114 on the camera 107. Alternatively or additionally, the object vectorizer 120 can include one or more classifiers to classify the object of interest 112 into a generic category.

From the generic classification of "vehicle" for the object of interest 112, the object vectorizer 120 uses one or more methods to sub-class discriminate features of the object of interest 112 to extract features 122 of the identified object of interest 112. Feature extraction methods can include, for example, unsupervised clusters to determine the most distinct features of the object of interest 112, supervised approaches (e.g., based on geometric features, pattern recognition, region of the frame where the object appears, time of day, color, or the like), or a combination thereof.

The object vectorizer 120 provides, as output, a vectorized object 124, including extracted features 122 for the object of interest 112, to the cluster determiner 126. Extracted features 122 can include, in the example depicted in FIG. 1, a color of the object of interest 112, a geometry of the object of interest 112, a location in the driveway of home 108 where the object of interest 112 is parked, size of the target in the scene of the detection image, motion vectors for the truck in the driveway of home 108, and/or a time of day when the object of interest 112 is determined to be in the driveway of home 108.

Extracted features 122 can include strong visual features, e.g., lines, shapes, or symbols of the object of interest 112. For example, bumper stickers, bike racks, or other defining features on a vehicle can be utilized as extracted features.

Each extracted feature of multiple extracted features 122 can have a respective weight associated with the extracted feature. A weight associated with the extracted feature 122 is a measure of how distinct the particular extracted feature is for the object of interest 112 with respect to each other extracted feature 122 for the object of interest 112. For example, a geometric feature of the object of interest 112 (e.g., the outline of the flatbed portion of the truck) can have a larger weight than a particular position of the object of interest 112 in the driveway of the home 108. In another example, a color of the body of the truck (e.g., red) can have an equal weight as a position of a bumper stick on a back fender of the truck. In some implementations, equal weights are given to each of the multiple extract features for the object of interest 112. For example, for a set of 5 extracted features for object of interest 112, each extracted feature 122 has an assigned 20% weight to the particular extracted feature 122.

The weights of the extracted features 122 for the vectorized object 124 can be used to determine more important or less important features when determining a respective cluster for the vectorized object 124 by the cluster determiner 126.

The cluster determiner 126 receives, as input, the vectorized object 124 including the multiple extracted features 122 and assigned respective weights for the object of interest 112 in the detection image 118. Cluster analysis is performed on the vectorized object 124. Cluster analysis can be performed using, for example, K-means, nearest neighbor, mean-shift, hierarchical methods, or the like. The cluster determiner 126 can generate, as output, a "truck" cluster 128a for the vectorized object 124.

In some implementations, the cluster determiner 126 can determine using cluster analysis, that the vectorized object 124 is clustered into a previously generated cluster, e.g., "sedan" cluster 128b, "N" cluster 128c.

Though described in stages A and B in terms of capturing detection images 118 and extracting features 122 from the detection images by the object vectorizer 120 to generate vectorized objects 124, the object vectorizer 120 may alternatively or additionally generate vectorized objects 124 that include three dimensional (3D) models for the object of interest 112 using 3D texture extracted from the detection images 118 captured by the surveillance devices 106.

Surveillance data including imaging data from the surveillance devices 106 can track movement of the object of interest 112, e.g., a truck, within a field of view 110 of the camera 107, e.g., the truck pulling into/leaving the driveway, and determine a possible angle of the truck that is being observed. Determining a position of the object of interest 112 within the field of view 110 of the camera 107 and what angles of the object of interest 112 are being captured can be achieved, for example, by applying a 3D bounding box around the object of interest 112 and using one or more object classifiers to identify a particular type of object of interest 112 based in part on the dimensions, movement, texture, or the like of the object within the 3D bounding box. For example, as the truck is entering the driveway, camera 107 can determine that a side and part of a front of the truck are captured in the field of view 110 of the camera. In another example, as the truck is exiting the driveway, the camera 107 can determine that a side and a portion of the back of the truck are captured in the field of view 110 of the camera.

An initial 3D model of the object of interest 112 is generated from the imaging data captured by the camera 107 of the object of interest 112. The object vectorizer 120 can generate an initial 3D model for the object of interest, where the cluster determiner 126 may associate an object of interest 112 with a particular 3D model of the object of interest 112 and generate a cluster 128a for the object of interest 112 and 3D model. For example, the object vectorizer can generate an initial 3D model for what it determines to be a truck, including multiple angles of the truck (e.g., front, back, side views, etc.) and assign it to a "truck" cluster 128a.

The system 102 collects additional imaging data of the object of interest 112 and the cluster determiner 126 can add additional 3D textures, e.g., additional viewpoints of the object of interest 112, extracted from the 3D bounding box surrounding the object of interest 112 in the imaging data 118 to the 3D model for the cluster 128a. The 3D model for the particular cluster 128a can be expanded by adding additional viewpoints of the object of interest 112 that are determined to be part of a same cluster 128a based in part on expected movements of the object of interest 112. For example, if a truck enters and exits the driveway of the home in a same manner each weekday, the system 102 can collect additional instances of the truck from different angles in the driveway by tracking a same expected motion of the truck in the driveway over time.

Clustering of the extracted 3D textures and/or features extracted from detection images into respective clusters can be performed, for example, using a Siamese network. The Siamese network is a deep learning model which is trained to embed similar images close to each other and the different images far away from each other in the embedding space. Using the Siamese network, extracted 3D textures and/or features from the captured detection images can be mapped to a vectorized object 124 and a Euclidian distance can be used to find the distance/similarity between a pair of objects of interest 112.

In some implementations, the cluster determiner 126 can receive, e.g., from a homeowner, from a technician installing the system, etc., a pre-assumption about a particular number of clusters to generate and subsequently cluster the imaging data to comply with the particular number. The pre-assumption for a particular number of clusters can be based on prior knowledge about the object-of-interest(s) for the home. For example, a number of vehicles that is typically found at the home, e.g., the owner's vehicles, can be used to set the pre-assumed number of clusters to generate for the cluster determiner.

As depicted in the example presented in FIG. 1, the cluster determiner 126 determines that vectorized object 124 is sufficiently different from other previously generated clusters and generates a new cluster 128a including multiple extracted features 122 and corresponding weights. As additional detection images 118 of the object of interest 112 are converted into vectorized objects 124, the cluster determiner 126 can add the additional vectorized objects 124 to the "truck" cluster 128a. A tightness or strength of the cluster 128a is determined. Tightness or strength of the cluster 128a can be determined based in part on a particular method for cluster analysis, e.g., Euclidean distance, cohesion, or the like.

The cluster verification module 130 can determine if a particular cluster 128a meets a threshold of strength and a minimum number of associated detection images 118. In some implementations, the cluster verifications module 130 can run a continuous analysis on the strength of the cluster 128a in order to determine when a threshold of strength has been met.

In some implementations, the cluster verification module 130 can determine if a particular cluster 128a meets a threshold of strength based in part on a confidence level associated with a 3D model of the object of interest 112 represented by the cluster 128a.

The cluster verification module 130 can select, a representative image 132 from the associated detection images 118, where each of the associated detection images 118 include the object of interest 112. The representative image 132 can be selected from the associated detection images 118 of the cluster 128a by finding a center of the cluster 128a, e.g., the image that has a highest level of confidence for the set of multiple detection images 118 in the cluster 128a.

In some implementations, a representative image 132 can be a less-representative image of the cluster 128a, that is, an image that is from an edge of the cluster 128a where the system 102 may have less confidence that the less-representative image includes the object of interest 112 for the cluster 128a. For example, a less-representative image can be an image including an off-angle of the truck in the driveway of home 108, or an image of the truck at night where the color of the truck is less recognizable due to the lighting conditions.

In stage C of FIG. 1, the cluster verification module 130 can generate a query 134 to provide to a user of a user device 136 in an application environment 138. User device 136 may include a device that hosts and displays an application including an application environment 138. For example, a user device 136 is a mobile device that hosts one or more native applications that includes an application environment 138 (e.g., a graphical-user interface (GUI)) through which a user of the user device 136 may interact with the semi-supervised object recognition model training system 102 and/or the home monitoring system 104. The user device 136 may be a cellular phone or a non-cellular locally networked device with a display. The user device 136 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 136 may perform functions unrelated to the semi-supervised object recognition model training system 102, such as placing personal telephone calls, playing music, playing video, displaying pictures, browsing the Internet, maintaining an electronic calendar, etc.

An application can be a software/firmware program running on the corresponding mobile device that enables the user interface and features described throughout, and is a system through which the semi-supervised object recognition model training system 102 may communicate with the user on user device 136. The user device 136 may load or install the application including the application environment 138 based on data received over a network or data received from local media. The application runs on mobile devices platforms, such as iPhone, iPod touch, Blackberry, Google Android, Windows Mobile, etc. The one or more user devices 136 may receive the data from the semi-supervised object recognition model training system through the network, as described in more detail above. In one example, the user application environment 138 enables the user of user device 136 to provide feedback responsive to query 134 from the semi-supervised object recognition model training system 102.

In some implementations, the application environment 138 is a part of a home monitoring application for the home monitoring system 104. For example, a user of user device 136 may receive alerts through the application environment 138 that are related to the semi-supervised object recognition model training system 102 and notifications from the home monitoring system 104 that are related to home monitoring (e.g., home security).

The query 134 provided to the user device 136 to be presented in application environment 138 can include, a representative image 132 including the object of interest 112 and a one or more query prompt 133, e.g., a textual or audio-based query question(s) related to the representative image 132. For example, as depicted in Stage C of FIG. 1, the query 134 presented in the application environment 138 includes a representative image 132 of the object of interest 112 and a textual query "Is this your truck?" In another example, an audio-based prompt can be presented with the representative image 132.

In some implementations, a query prompt 133 can include a request for the user to provide feedback including one or more labels for the cluster. The application environment 138 can include an input for the user to provide a textual label and/or a verbal command, which can be converted (e.g., using natural language syntax) to a textual label for the cluster 128a. For example, a query prompt 133 can be "do you want to label this truck?" where a user is prompted to provide one or more labels for the object of interest 112.

In some implementations, multiple different representative images 132 can be presented to the user in query 134, e.g., multiple different views of the object of interest 112. For example, multiple representative images of the object of interest 112 can be included in query 134, where each image of the object of interest 112 may highlight a different feature of the truck, different lighting conditions, different dates when the images were generated, or the like.

User feedback 140 can be provided by a user of the user device 136 through the application environment 138 as input to the cluster verification module 130. User feedback 140 can include a positive or negative response, e.g., "yes" or "no." User feedback 140 can include one or more labels for the object of interest 112 identified in the representative image. For example, responsive to the query prompt 133, a user may provide one or more labels such as "Allison's truck," or "this is my truck." User feedback 140 can include a signal from the user that the user is not interested in the object of interest 112 presented in the representative image 132 of the query 134, e.g., "I don't want to label this truck," or another input that declines interest in the object of interest 112 or an input that declines to specifically identify the object of interest 112.

Cluster verification module 130 can receive the user feedback 140 and determine, based on the user feedback 140 to affirm cluster 128a or retrain cluster 128a. Further details of using the user feedback to retrain or affirm cluster 128a based on user feedback 140 are described with reference to FIG. 2.

In stage D of FIG. 1, each cluster 128a, 128b, 128c that is affirmed by the user to be a representative cluster of an object of interest 112 is used to train the object recognition model 142. Object recognition model 142 can be provided to one or more surveillance devices 106 of the home monitoring system 104, e.g., camera 107 to utilize for detecting objects of interest 112. An object recognition model can be site-specific, where the site-specific object recognition model 142 can be trained to recognize particular objects, e.g., vehicles, humans, animals, that are frequently present at a particular location, e.g., that are frequently present at a home. Site-specific object recognition models can vary between different locations, where each location has a site-specific object recognition model trained to recognize a particular set of objects that are particular to the location, e.g., a homeowner's car at a home, a resident of the home, or the like.

In some implementations, the semi-supervised object recognition model training system 102 can train different object recognition models 142 for different home monitoring systems such that a home monitoring system 104 for a particular home 108 is customized for the particular objects of interest 112 for the particular home 108. For example, Home A may have two associated vehicles, a truck and a sedan, belonging to homeowners of Home A. The object recognition model 142 for Home A can be trained to recognize the truck and sedan for Home A. In another example, Home B may have two associated vehicles sedan 1 and sedan 2 belonging, respectively, to a nanny of Home B and a homeowner of Home B. The object recognition model for Home B can be trained to recognize sedan 1 and sedan 2 for Home B.

In some implementations, the semi-supervised object recognition model training system 102 can generate a different object recognition model 142 for each surveillance device 106 of the home monitoring system 104, e.g., different object recognition models 142 for each camera 107 of multiple cameras of a home security system.

In some implementations, once a cluster 128a is formed and affirmed by the user for the object of interest 112, the semi-supervised object recognition model training system 102 can continue to collect detection images 118 of the object of interest 112 to continue to refine the cluster 128a. The object recognition model 142 utilizing the cluster 128a can be retrained using the refined cluster 128a to generate an updated object recognition model 142.

In some implementations, pre-generated standard clusters can be provided to the semi-supervised object recognition model training system 102, e.g., when the home monitoring system 104 is installed. Standard clusters represent standard objects of interest that can be common between multiple different home monitoring systems 104 for different homes 108. Standard clusters can represent, for example, delivery trucks, mail trucks, package service trucks, garbage/utility trucks, or the like. Standard clusters can be included in the object recognition model 142 without requiring the semi-supervised object recognition model training system 102 to generate unique clusters for the standard objects of interest.

In some implementations, a user can define a number of clusters 128a, 128b, 128c for the semi-supervised object recognition model training system 102 to generate for the object recognition model 142. Information can be gathered from the user, e.g., when setting up the home monitoring system, to determine a number of clusters that is desired for the object recognition model 142. A number of clusters can correspond, for example, to a number of vehicles of interest, a number of residents or frequent visitors to the home 108, or the like. For example, a home 108 can have two vehicles that are owned by two residents of the home 108 such that the user can define that the system 102 should generate four clusters total, e.g., one for each vehicle and one for each resident.

In some implementations, the cluster determiner 126 can determine to merge multiple clusters based in part on a set number of clusters provided by the user. For example, the cluster determiner 126 can merge a looser grouping of several cars that may be related, e.g., in a cluster that may have a lower overall tightness, and query 134 the user to verify that the multiple clusters all represent a same car. The system 102 can use the user feedback 140 from the user to then identify the extracted features 122 that link the multiple clusters together and adjust the respective weights of each of the features. The adjusted weights can emphasize the extracted features 122 that the multiple clusters identified as the same object of interest 112 share in common, and de-emphasize the features that are recognized by the system 102 to be sufficiently different. For example, under various lighting conditions (e.g., daytime, nighttime, cloudy/sunny, etc.) a color of a vehicle can be recognized as a different color, which can cause the system 102 to classify an image of the vehicle on a sunny day into a cluster A and an image of the vehicle on a cloudy day into a cluster B. If the user provides feedback identifying cluster A and cluster B being representative of the same vehicle, the system 102 can adjusts the weights of the extracted features 122 to de-emphasize (e.g., set to a minimal value) the color feature of the vehicle and emphasize another feature, e.g., geometric shape of the vehicle.

In some implementations, in order to merge multiple clusters, the cluster determiner 126 extends the allowable distance between images of the cluster, thereby reducing the tightness of the cluster. An optimization scheme can be utilized to achieve an optimized tightness of the merged cluster while still including all of the images of the multiple clusters in the merged cluster.

In some implementations, in order to merge multiple clusters, the cluster determiner 126 can adjust the weights of the like features in order to move the clusters closer together and merge them. An optimization scheme can be utilized to adjust the weights of the like features of the multiple clusters to achieve an optimized tightness of the merged cluster. Conversely, for images of objects that are determined to be different, e.g., through negative feedback, weights of the features can be adjusted to move the clusters further apart.

In some implementations, a minimum number of images required for a cluster to include before the cluster verification module 130 presents a query 134 to the user can be selected. In one example, a minimum of five images is required for a cluster before the cluster verification module 130 can determine to query the user. Additionally, or alternatively, a cluster must meet a threshold of tightness of the cluster before the cluster verification module 130 can query 134 the user with a representative image of the cluster.

Different methods can be utilized to measure a tightness of the cluster including, for example by Euclidean distance, cohesion approach, or the like. A number of clusters can be dynamically adjusted to optimize a cluster tightness of each of the number of clusters.

In some implementations, a cluster can include a collection of images which represent objects that the user is not interested in, e.g., infrequent or random detections of vehicles in the driveway. A user can indicate, through user feedback 140, that the user is not interested in training the object recognition model to recognize a particular vehicle. The system 102 can generate a cluster designated to contain the images of objects that are not of interest to the user, e.g., an "unknown" cluster or a "not interested" cluster.

In some implementations, a number of clusters for an object recognition model 142 can include a number of clusters designated by a user, e.g., a homeowner of home 108, and additionally include a cluster to include all the objects that the user is not interested in including in the object recognition model 142 but have sufficient numbers of detections images 118 to generate a cluster. For example, an unknown cluster can include images of a postal service delivery truck that appears once a day in front of home 108. Though the system 102 has accumulated sufficient numbers of detection images of the postal service delivery truck, e.g., after two weeks, the user can designate that they are not interested in including the postal service delivery truck into the object recognition model 142. The system 102 may then add the postal service delivery truck detection images 118 into the unknown cluster.

Once the object recognition model 142 is trained using the multiple clusters 128a, 128b, 128c, the object recognition model 142 can be provided to the home monitoring system 104, e.g., to camera 107 to utilize in detecting objects of interest for home 108. For each new detection image, the object recognition model 142 can determine that an object of interest 112 in the image 116 is a particular object of interest, e.g., the truck of FIG. 1 and the home monitoring system 104 may use this information to notify the user of the user device 136 through the application 138 of the presence of the truck, e.g., "Allison's truck is in the driveway."

Figure 2:
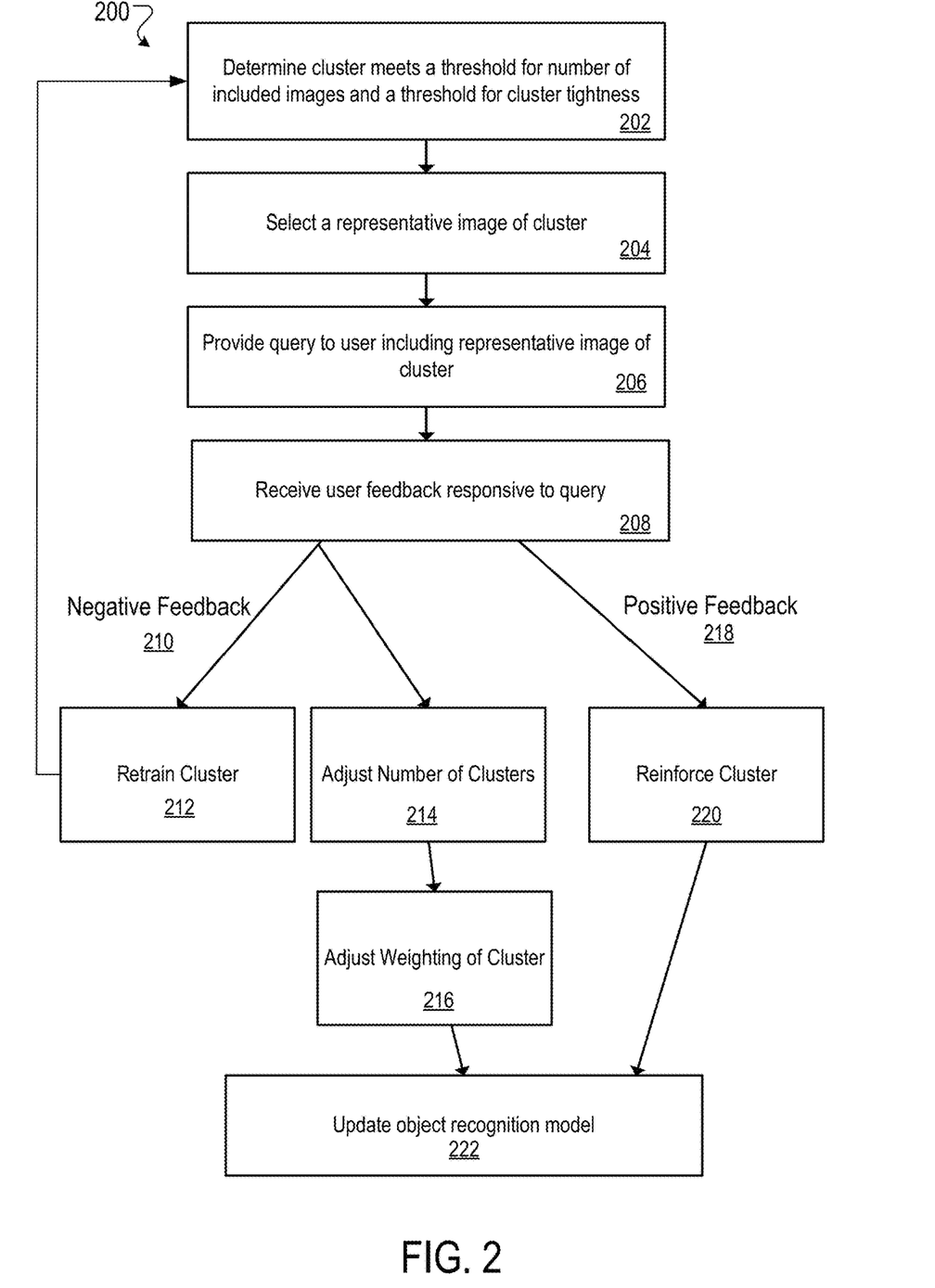
FIG. 2 is a flow diagram of an example process for semi-supervised training of an object recognition model.

FIG. 2 is a flow diagram of an example process 200 for semi-supervised training of an object recognition model for a home monitoring system. A cluster is determined to meet a threshold for a number of included images and a threshold for cluster tightness (202). In some implementations a threshold number of included images can be, for example, five images, ten images, or the like. A threshold of cluster tightness can depend on the particular objects of interest for the site-specific object recognition model. In one example, a home including two grey sedans require a higher threshold of cluster tightness to distinguish one grey sedan from a different grey sedan having substantial overlapping features. In another example, a home including a white truck and a red sedan can require a lower threshold of cluster tightness to distinguish the two dissimilar vehicles.

In some implementations, clustering analysis can be performed on the extracted features 122 of a set of multiple collected detection images 118 of an object of interest 112. Cluster analysis can include a proceeding dimensionality reduction step, e.g., principle component analysis (PCA) or T-distributed Stochastic Neighbor Embedding (TSNE) to reduce the complexity of the data and enable the process of clustering.

In some implementations, there is an initiation period after installation of the home monitoring system 104 including surveillance devices 106 to collect sufficient detection images in order to form clusters, e.g., two weeks, ten days, or the like. A period of time, e.g., two weeks, ten days, etc., to collect sufficient images of a new object of interest 112 to form a cluster 128a can depend on a frequency of collected detection images 118 including the new object of interest 112 at home 108. For example, if a babysitter visits home 108 once a week, it may take five to six weeks to collect sufficient detection images 118 of the babysitter's car before the cluster verification module 130 determines to verify the cluster of the babysitter's car.

A representative image is selected for the cluster (204) to present to the user of user device 136 through the application environment 138. The representative image 132 can be selected by the cluster verification module 130 as a center image of the cluster, e.g., cluster 128a. The center image of the cluster 128a can be used by the cluster verification module 130 to identify the cluster 128a and establish a set of semi-ground truth images for the cluster 128a, where the verified representative image is a ground-truth image and the other images in the cluster are cluster-assumed ground truth images.

A query is provided to the user including a representative image of the cluster (206). The query 134 can be provided to the user on the user device 136 through application environment 138. Query 134 can include the one or more representative images 132 and a query prompt 133 requesting user feedback. In some implementations, a query prompt 133 can include a textual or audio-based query, requesting the user to confirm/deny an identity of the object of interest 112 presented in the representative image 132. The query prompt 133 can include a request for user input of a label or to provide additional information about the object of interest 112, e.g., "whose car is this?", "is this Jane's car?" or the like.

In some implementations, the cluster verification module 130 may select multiple representative images 132 to present to a user on a user device 136 through the application environment 138, where each of the multiple representative images 132 can be a detection image 118 captured under a particular set of conditions and/or different angles of the object of interest 112. For example, the multiple representative images 132 of the object of interest 112 can be captured at different times of day or under different lighting/weather conditions, and/or different views (e.g., back, front, side views) of the object of interest 112.

In some implementations, the representative image that is selected for the cluster is an image that is determined to be less representative of the cluster, e.g., farther of the edges of the cluster. The less-representative image from an edge of the cluster can be selected to verify the edges of the cluster, such that a query 134 provided to the user for this less-representative image can be directed towards verifying a particular cluster 128a rather than to identify the cluster 128a. For example, for the less-representative image, a query 134 can be "is this Allison's truck?" or "Is this also a truck?" rather than, for example, a query 134 for a representative image for the truck cluster 128a, e.g., "is this a truck?." The verification query process including a less-representative image for a cluster 128a can be repeated with multiple less-representative images in order to determine a boundary for the cluster 128a.

User feedback is received responsive to the query (208). User feedback 140 can include text, speech-to-text, or a combination thereof provided by the user of the user device 136 through the application environment 138. Examples of user feedback 140 can include, "yes," "no," "I'm not interested in this car," "that's Jane's car," "that is my car," "this is also Allison's truck." Natural language processing can be used to interpret the user feedback 140 and generate instructions for the cluster verification module 130 to further processing of the cluster 128a.

In some implementations, the application environment 138 can present the user of the user device with multiple pre-defined responses to query 134, for example, as soft-key buttons, to generate user feedback 140 for the cluster verification module 130. Soft-key buttons can include "yes", "no," and "ignore."

In some implementations, user feedback is negative feedback (210). Negative feedback responsive to a query 134 for a cluster can indicate that the cluster determiner 126 includes multiple different objects of interest 112 rather than an assumed single object of interest 112. In one example, negative feedback can be an indication that the cluster 128a includes detection images 118 for multiple different trucks 112 rather than a single object of interest 112 that the user may be interested in, e.g., "those are different trucks," or "that is not my truck," or "that one is of Allison's truck, not my truck."

Negative feedback from the user can be indicative that the cluster requires retraining (212). In the example presented above of multiple objects of interest 112 being clustered into a single cluster, retraining can include adjusting the weights of one or more of the extracted features 122 of the vectorized objects 124 of the cluster 128a until the two objects of interest 112 are sufficiently separated into two distinct clusters. Dispersing the "bad" cluster responsive to the negative feedback can result in the system 102 re-performing the clustering analysis on the vectorized objects to form multiple clusters each with an optimized tightness of cluster. The system 102 may then provide queries 134 to the user to verify the newly formed clusters each representing a unique object of interest 112.

In some implementations, negative feedback from the user can be indicative that a number of clusters requires adjustment (214). Adjustments to a number of clusters can be to reduce a number of clusters by merging two or more clusters or to divide a cluster into two or more distinct clusters.

In some implementations, negative feedback from the user can indicate that two of more clusters are representative of a same object of interest. The two or more clusters can be combined to form a merged cluster, and weighting of the multiple extracted features of the merged cluster can be adjusted (216) to optimize a tightness of the merged cluster.

In one example, two of more clusters that each represent a same object of interest can be a strong cluster 128a representing a truck, and a slightly weaker cluster 128c that includes images that are softly clustered, e.g., images taken during inclement weather, different angles, etc., where a confidence measure in the weaker cluster is lower. The cluster verification module 130 can prompt the user with a query 134 and receive user feedback 140 including "these are also the truck." The system 102 can then broaden the extracted features 122 used to define a single merged cluster by expanding the distance of the cluster, and adding which extracted features 122 are used for identification by adjusting the respective weights for each of the extracted features 122. Negative feedback from the user can be used to retain the weighting of the features of the cluster, e.g., to weight the features less heavily, in order to force clusters further apart.

In some implementations, two very dissimilar objects of interest 112 e.g., a pickup truck and sedan, can each have a lower tightness threshold for verifying a cluster, compared to two or more similar objects, e.g., two sedans, might require larger distances established between the two sedan clusters and have higher tightness threshold before a particular cluster is verified.

In some implementations, user feedback is positive feedback (218). Positive feedback from the user can confirm a ground truth of the representative image and be used to establish that the particular cluster corresponds to the particular object of interest that is represented by the particular cluster. Affirmation by the user can reinforce the cluster (220). Reinforcing the cluster can include verifying that the cluster is representative of a particular object of interest 112, e.g., the truck, and generate a set of semi-ground truth images including the representative image and the other clustered images in the cluster. The set of semi-ground truth images can be used, in combination with other generated clusters each including a respective set of semi-ground truth images, to train a new classifier to discriminate between different sub-classes of objects. Alternatively, or additionally, a cluster map for the verified cluster can be used a classifier for discriminating between different sub-classes of objects, e.g., different vehicles at home 108.

The object recognition model is updated (222). The object recognition model 142 can be retrained using the semi-ground truth images as a site-specific sub-class discrimination training set, where feature differences of particular objects of interest can be emphasized to more effectively detect and identify the site-specific objects of interest. For example, the object recognition model 142 can be trained on vehicle-specific clusters including a site-specific set of semi-ground truth images for several models of sedans to differentiate between the different models of a same style of car. In another example, the object recognition model 142 can be trained on animal-specific clusters to differentiate between different types of animals, e.g., different breeds of dogs.

In some implementations, the parts of the process 200 of user feedback is negative feedback (210) and user feedback is positive feedback (218) may be receiving user feedback responsive to the query. Additionally, the parts of the process 200 of negative feedback from the user can be indicative that the cluster requires retraining (212), a number of clusters requires adjustment (214), the two or more clusters can be combined to form a merged cluster, and weighting of the multiple extracted features of the merged cluster can be adjusted (216), and affirmation by the user can reinforce the cluster (220) may be updating an object recognition model based on the user feedback.

In some implementations, updating an object recognition model based on the user feedback includes determining that the user feedback is negative and, in response to determining that the user feedback is negative, retraining the cluster of images to include a different set of images. For example, the cluster verification module 130 may determine that user feedback indicates that an object shown in a representative image was not a particular truck and, in response, retrains the cluster determiner 126 to include the representative image in a cluster that does not include images of the particular truck.

In some implementations, updating an object recognition model based on the user feedback includes determining that the user feedback is negative and in response to determining that the user feedback is negative, combining the cluster of images and another cluster of images. For example, the cluster verification module 130 may determine that user feedback indicates that an object shown in a representative image is the same object shown in another cluster and, in response, retrains the cluster determiner 126 to combine both clusters.

In some implementations, updating an object recognition model based on the user feedback includes determining that the user feedback is positive and in response to determining that the user feedback is positive, updating the object recognition model with the cluster of images. For example, the cluster verification module 130 may determine that user feedback verifies that an object shown in a representative image is a particular object and, in response, updates the object recognition model 222 to detect features in the cluster as the particular object.

In some implementations, updating an object recognition model based on the user feedback includes determining that the user feedback is positive and in response to determining that the user feedback is positive, reinforcing the cluster. For example, the cluster verification module 130 may determine that user feedback verifies that an object shown in a representative image is a particular object and, in response, retrains the cluster determiner 126 to make the cluster tighter.

In some implementations, selecting a representative image includes selecting a particular image from a center of the cluster, where the query requests that the user identify the object in the particular image. For example, the cluster verification module 130 may select a particular image of a truck near a center of a cluster that includes the particular image and ask the user to identify the object shown in the image.

In some implementations, selecting a representative image includes selecting a particular image from an edge of the cluster, where the query provides an identity of an object in the particular image and requests that the user verify the identity of the object. For example, the cluster verification module 130 may select a particular image of a truck near an edge of a cluster that includes the particular image and ask the user to verify that the object shown in the particular image is the truck.

In some implementations, the process 200 includes detecting an object based on the object recognition model and providing, to a user, an alert that indicates that the object was detected. For example, once the object recognition model is trained with a cluster of images of a truck, the system 100 may detect the truck in images and transmit an alert that the truck was detected to one or more computing devices used by a user that provided the user feedback.

Figure 3:
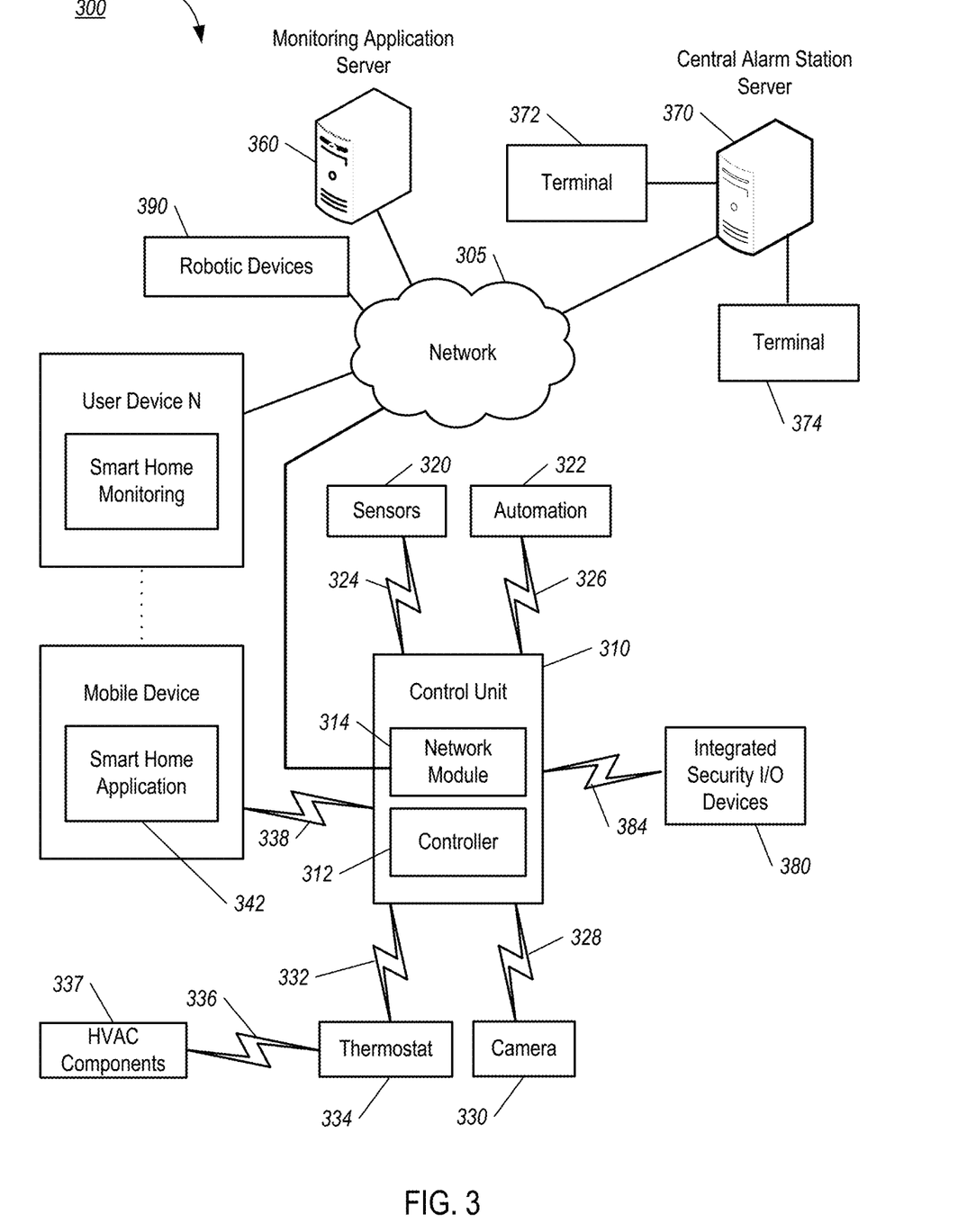
FIG. 3 shows a diagram illustrating an example home monitoring system.

FIG. 3 is a diagram illustrating an example of a home monitoring system 300. The monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. In addition, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

In addition, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events generated by the control unit 310. In this example, the monitoring server 360 may exchange electronic communications with the network module 314 included in the control unit 310 to receive information regarding events detected by the control unit 310. The monitoring server 360 also may receive information regarding events from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The monitoring server 360 can be configured to provide information (e.g., activity patterns) related to one or more residents of the home monitored by the system 300 (e.g., user). For example, one or more of the sensors 320, the home automation controls 322, the camera 330, the thermostat 334, and the integrated security devices 380 can collect data related to a resident including location information (e.g., if the resident is home or is not home) and provide location information to the thermostat 334.

The central alarm station server 370 is an electronic device configured to provide alarm monitoring service by exchanging communications with the control unit 310, the one or more user devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more user devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the home monitoring application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a home monitoring application 352. The home monitoring application 342 refers to a software/firmware program running on the corresponding mobile device that enables the user interface and features described throughout. The user device 340 may load or install the home monitoring application 342 based on data received over a network or data received from local media. The home monitoring application 342 runs on mobile devices platforms, such as iPhone, iPod touch, Blackberry, Google Android, Windows Mobile, etc. The home monitoring application 342 enables the user device 340 to receive and process image and sensor data from the monitoring system.

The user device 340 may be a general-purpose computer (e.g., a desktop personal computer, a workstation, or a laptop computer) that is configured to communicate with the monitoring server 360 and/or the control unit 310 over the network 305. The user device 340 may be configured to display a smart home user interface 352 that is generated by the user device 340 or generated by the monitoring server 360. For example, the user device 340 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390, and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390, and are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, and the robotic devices 390 to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
one or more computers and one or more storage devices storing instructions that are operable, when executed by the one or more computers, to cause the one or more computers to perform operations comprising:
determining that a cluster of images meets a threshold for a number of included images and a threshold for cluster tightness;
selecting a representative image of the cluster;
providing a query including the representative image of the cluster;
receiving user feedback responsive to the query; and
updating an object recognition model based on the user feedback, the updating comprising:
determining that the user feedback is negative; and
in response to determining that the user feedback is negative, combining the cluster of images and another cluster of images.

2. The system of claim 1, wherein updating an object recognition model based on the user feedback comprises:
determining that the user feedback is negative; and
in response to determining that the user feedback is negative, retraining the cluster of images to include a different set of images.

3. The system of claim 1, wherein updating an object recognition model based on the user feedback comprises:
determining that the user feedback is positive; and
in response to determining that the user feedback is positive, updating the object recognition model with the cluster of images.

4. The system of claim 1, wherein updating an object recognition model based on the user feedback comprises:
determining that the user feedback is positive; and
in response to determining that the user feedback is positive, reinforcing the cluster.

5. The system of claim 1, wherein selecting a representative image comprises:
selecting a particular image from a center of the cluster, wherein the query requests that a user identify an object in the particular image.

6. The system of claim 1, wherein selecting a representative image comprises:
selecting a particular image from an edge of the cluster, wherein the query provides an identity of an object in the particular image and requests that a user verify the identity of the object.

7. The system of claim 1, the operations comprising:
detecting an object based on the object recognition model; and
providing, to a user, an alert that indicates that the object was detected.

8. The monitoring system of claim 1, wherein:
the cluster of images comprises a first plurality of extracted features with respective weights;
the other cluster of images comprises a second plurality of extracted features with respective weights; and
combining the cluster of images and the other cluster of images comprises adjusting the respective weights of the first plurality of extracted features and the respective weights of the second plurality of extracted features.

9. The monitoring system of claim 8, wherein adjusting the respective weights of the first plurality of extracted features and the respective weights of the second plurality of extracted features reduces a distance between the cluster and the other cluster of images.

10. A computer-implemented method comprising:
determining that a cluster of images meets a threshold for a number of included images and a threshold for cluster tightness;
selecting a representative image of the cluster;
providing a query including the representative image of the cluster;
receiving user feedback responsive to the query; and
updating an object recognition model based on the user feedback, the updating comprising:
determining that the user feedback is negative; and
in response to determining that the user feedback is negative, combining the cluster of images and another cluster of images.

11. The method of claim 10, wherein updating an object recognition model based on the user feedback comprises:
determining that the user feedback is negative; and
in response to determining that the user feedback is negative, retraining the cluster of images to include a different set of images.

12. The method of claim 10, wherein updating an object recognition model based on the user feedback comprises:
determining that the user feedback is positive; and
in response to determining that the user feedback is positive, updating the object recognition model with the cluster of images.

13. The method of claim 10, wherein updating an object recognition model based on the user feedback comprises:
determining that the user feedback is positive; and
in response to determining that the user feedback is positive, reinforcing the cluster.

14. The method of claim 10, wherein selecting a representative image comprises:
selecting a particular image from a center of the cluster, wherein the query requests that a user identify an object in the particular image.

15. The method of claim 10, wherein selecting a representative image comprises:
selecting a particular image from an edge of the cluster, wherein the query provides an identity of an object in the particular image and requests that a user verify the identity of the object.

16. The method of claim 10, comprising:
detecting an object based on the object recognition model; and
providing, to a user, an alert that indicates that the object was detected.

17. The method of claim 10, wherein:
the cluster of images comprises a first plurality of extracted features with respective weights;
the other cluster of images comprises a second plurality of extracted features with respective weights; and
combining the cluster of images and the other cluster of images comprises adjusting the respective weights of the first plurality of extracted features and the respective weights of the second plurality of extracted features.

18. A non-transitory computer-readable medium storing software comprising instructions executable by one or more computers which, upon such execution, cause the one or more computers to perform operations comprising:

determining that a cluster of images meets a threshold for a number of included images and a threshold for cluster tightness;

selecting a representative image of the cluster;

providing a query including the representative image of the cluster;

receiving user feedback responsive to the query; and updating an object recognition model based on the user feedback, the updating comprising:
- determining that the user feedback is negative; and
- in response to determining that the user feedback is negative, combining the cluster of images and another cluster of images.

19. The computer-readable medium of claim 18, wherein updating an object recognition model based on the user feedback comprises:

determining that the user feedback is negative; and in response to determining that the user feedback is negative, retraining the cluster of images to include a different set of images.

20. The computer-readable medium of claim 18, wherein updating an object recognition model based on the user feedback comprises:

determining that the user feedback is positive; and in response to determining that the user feedback is positive, updating the object recognition model with the cluster of images.

* * * * *